United States Patent
Ma et al.

(10) Patent No.: US 9,894,689 B2
(45) Date of Patent: Feb. 13, 2018

(54) SYSTEM, METHOD, AND LOGIC FOR IDENTIFYING DEVICES FOR A VIRTUAL MEETING SESSION

(71) Applicant: CISCO TECHNOLOGY, INC., San Jose, CA (US)

(72) Inventors: Junhua Ma, Shanghai (CN); Bo Lei, Shanghai (CN); Zhigang Peng, Shanghai (CN); Yanhui Wang, Shanghai (CN); Xiaohui Yu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 615 days.

(21) Appl. No.: 14/502,970

(22) Filed: Sep. 30, 2014

(65) Prior Publication Data

US 2016/0095141 A1    Mar. 31, 2016

(51) Int. Cl.
*H04W 76/02* (2009.01)
*H04M 1/26* (2006.01)
*H04N 7/15* (2006.01)
*H04L 29/06* (2006.01)
*H04M 1/253* (2006.01)

(52) U.S. Cl.
CPC ......... *H04W 76/02* (2013.01); *H04L 65/1069* (2013.01); *H04L 65/403* (2013.01); *H04M 1/2535* (2013.01); *H04N 7/15* (2013.01); *H04M 2250/62* (2013.01)

(58) Field of Classification Search
CPC .............. H04L 65/1069; H04L 65/403; H04M 1/2535; H04M 2250/62; H04N 7/15; H04W 76/02
See application file for complete search history.

(56) References Cited

U.S. PATENT DOCUMENTS

| | | | |
|---|---|---|---|
| 5,774,117 A | 6/1998 | Kukkal | |
| 7,412,047 B2 | 8/2008 | Nguyen et al. | |
| 8,831,196 B2* | 9/2014 | Moyers | G06Q 10/10 370/352 |
| 9,407,862 B1* | 8/2016 | Jawad | H04N 7/141 |
| 2005/0281237 A1* | 12/2005 | Heinonen | H04L 29/06 370/338 |
| 2010/0023876 A1* | 1/2010 | Shuf | H04L 12/1827 715/753 |
| 2010/0315483 A1 | 12/2010 | King | |
| 2012/0226997 A1* | 9/2012 | Pang | H04L 65/4038 715/753 |
| 2014/0241515 A1 | 8/2014 | Oswal et al. | |

OTHER PUBLICATIONS

*Bluetooth®*, "Phone Book Access Profile," Aug. 26, 2010, V11r00, Car Working Group, 41 pages.

* cited by examiner

*Primary Examiner* — Liton Miah

(57) ABSTRACT

Example systems, methods, and logic are provided herein for detecting a numerical identifier of an endpoint. In one example, a connectivity manager establishes a wireless communication session with a fixed endpoint using a wireless communication protocol. The connectivity manager module then generates a Phone Book Access Profile (PBAP) request to download a phone number associated with the fixed endpoint. The connectivity manager module receives, via the wireless communication session, a PBAP response comprising a phone number identifying the fixed endpoint and inputs the phone number identifying the fixed endpoint into a field used for initiating a call to the fixed endpoint.

20 Claims, 8 Drawing Sheets

US 9,894,689 B2

SYSTEM, METHOD, AND LOGIC FOR IDENTIFYING DEVICES FOR A VIRTUAL MEETING SESSION

TECHNICAL FIELD

The present disclosure relates generally to network systems and, more particularly, to identifying a numerical identifier of endpoint for connecting to a virtual meeting session.

BACKGROUND

Electronic communications such as emails chats, online conferences, videoconferences, voice over Internet protocol (VoIP) are an integral part of productivity in the modern workforce. In the case of online conferences, users are often provided with video data associated with the meeting. Some online conference systems enable users to participating in an audio portion of the meeting by calling a conference number.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
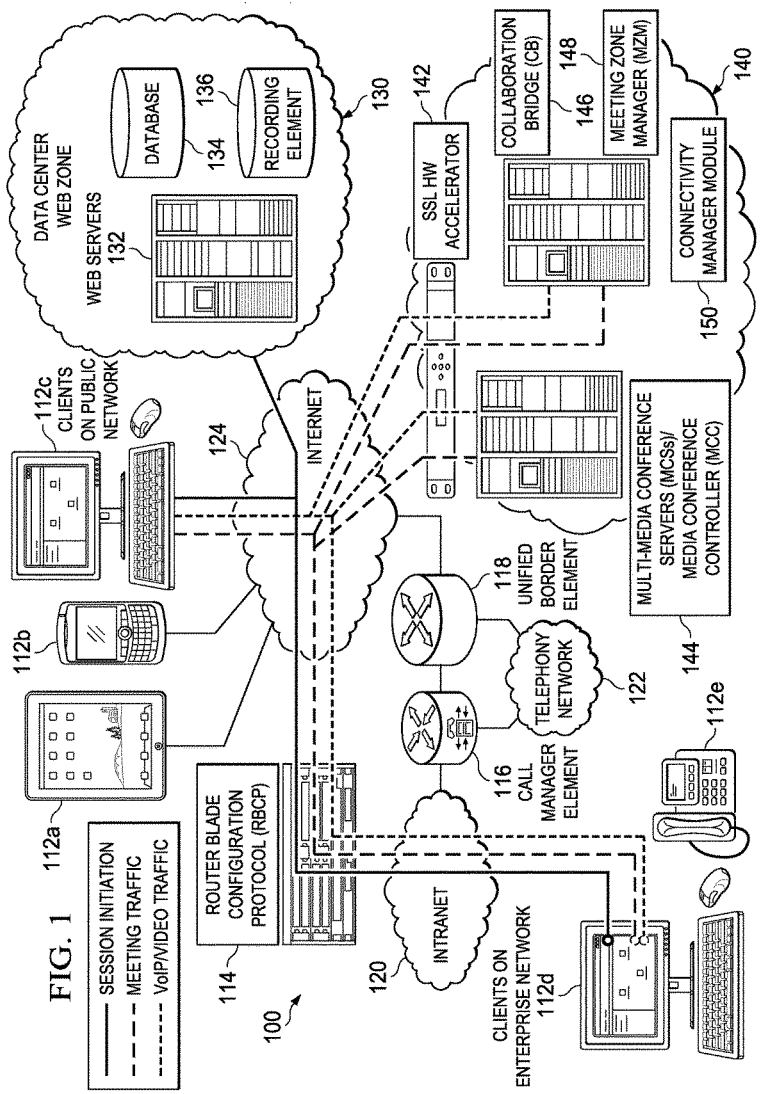
FIG. 1 is a simplified schematic diagram of a communication system for managing a conversation in accordance with one embodiment of the present disclosure.

In an implementation, a method for communication with a fixed endpoint comprises establishing a wireless communication session with a fixed endpoint using a wireless communication protocol; generating a Phone Book Access Profile (PBAP) request to download a phone number associated with the fixed endpoint; receiving, via the wireless communication session, a PBAP response comprising a phone number identifying the fixed endpoint; and inputting the phone number identifying the fixed endpoint into a field used for initiating a call to the fixed endpoint. In another implementation of the method, the phone number identifying the fixed endpoint is a temporary phone number that is assigned to the fixed endpoint based on a user logged into the online conference session. In yet another implementation of the method, the fixed endpoint is a desktop voice over Internet protocol (VoIP) phone. In still other implementations, the method further comprises initiating, using a telephony protocol (e.g., VoIP protocol), a call from the online conference session to the fixed endpoint using the phone number identifying the fixed endpoint. In yet other implementations of the method, the PBAP request is generated when one or more of the following criteria is met: detecting the execution of a virtual meeting application, detecting the launching of a window in the virtual meeting application, detecting an input from a button, or any other criteria detectable by a virtual meeting application.

In another implementation of the method, the PBAP response and the PBAP request are generated using an extended PBAP protocol, the extended PBAP protocol being extending to include data exchange over a plurality of wireless communication protocols.

In this implementation, the plurality of wireless communication protocols can comprise near field communication (NFC) and Bluetooth.

In still other implementations of the method, the method further comprises prior to the establishing the wireless communication session with the fixed endpoint, identifying the fixed endpoint by: detecting a proximity of each of a plurality of endpoints using one or more wireless transmission protocols; generating a list of candidate communication endpoints, the list excluding any of the plurality of endpoints that is already included in the online conference; and receiving a selection of fixed endpoint from the list.

In yet another implementation of the method, an audio data stream of at least one conference participant is provided to the fixed endpoint based on the initiated call.

In another implementation of the method, the method further comprises retrieving a phone number associated with a user; when it is determined that the phone number associated with the user does not match the phone number identifying the fixed endpoint, the phone number associated with the user is temporarily assigned to identify the fixed endpoint; when it is determined that the phone number associated with the user matches the phone number identifying the fixed endpoint, the phone number identifying the fixed endpoint remains unchanged; inputting the phone number associated with the user into a field used for initiating a call to the fixed endpoint. In this implementation of the method, the phone number associated with the user can be reassigned from a different fixed endpoint to the fixed endpoint. In some implementations, the method further comprises initiating, using the telephony protocol, the call from the online conference session to the fixed endpoint using the phone number associated with the user.

In an implementation, a computer-readable non-transitory medium comprising one or more instructions, for communication with a fixed endpoint, that when executed on a processor configure the processor to perform one or more operations comprising establishing a wireless communication session with a fixed endpoint using a wireless communication protocol; generating a Phone Book Access Profile (PBAP) request to download a phone number associated with the fixed endpoint; receiving, via the wireless communication session, a PBAP response comprising a phone number identifying the fixed endpoint; and inputting the phone number identifying the fixed endpoint into a field used for initiating a call to the fixed endpoint. In another implementation of the computer-readable non-transitory medium, the phone number identifying the fixed endpoint is a temporary phone number that is assigned to the fixed endpoint based on a user logged into the online conference session. In yet another implementation of the computer-readable non-transitory medium, the fixed endpoint is a desktop voice over Internet protocol (VoIP) phone. In still other implementations of the computer-readable non-transitory medium, the one or more operations further comprise initiating, using a telephony protocol (e.g., VoIP protocol), a call from the online conference session to the fixed endpoint using the phone number identifying the fixed endpoint. In yet another implementation of the computer-readable non-transitory medium, an audio data stream of at least one conference participant is provided to the fixed endpoint based on the initiated call. In yet other implementations of the computer-readable non-transitory medium, the PBAP request is generated when one or more of the following criteria is met: detecting the execution of a virtual meeting application, detecting the launching of a window in the virtual meeting application, detecting an input from a button, or any other criteria detectable by a virtual meeting application.

In another implementation of the computer-readable non-transitory medium, the PBAP response and the PBAP request are generated using an extended PBAP protocol, the extended PBAP protocol being extending to include data exchange over a plurality of wireless communication protocols. In this implementation of the computer-readable non-transitory medium, the plurality of wireless communication protocols can comprise near field communication (NFC) and Bluetooth.

In still other implementations of the computer-readable non-transitory medium, the computer-readable non-transitory medium (and/or one or more operations) further comprises prior to the establishing the wireless communication session with the fixed endpoint, identifying the fixed endpoint by: detecting a proximity of each of a plurality of endpoints using one or more wireless transmission protocols; generating a list of candidate communication endpoints, the list excluding any of the plurality of endpoints that is already included in the online conference; and receiving a selection of fixed endpoint from the list.

In another implementation of the computer-readable non-transitory medium, the computer-readable non-transitory medium further comprises retrieving a phone number associated with a user; when it is determined that the phone number associated with the user does not match the phone number identifying the fixed endpoint, the phone number associated with the user is temporarily assigned to identify the fixed endpoint; when it is determined that the phone number associated with the user matches the phone number identifying the fixed endpoint, the phone number identifying the fixed endpoint remains unchanged; and inputting the phone number associated with the user into a field used for initiating a call to the fixed endpoint. In this implementation of the computer-readable non-transitory medium, the phone number associated with the user can be reassigned from a different fixed endpoint to the fixed endpoint. In some implementations of the computer-readable non-transitory medium, the computer-readable non-transitory medium (and/or one or more operations) further comprises initiating, using the telephony protocol, the call from the online conference session to the fixed endpoint using the phone number associated with the user.

In an implementation, an endpoint comprises a memory element configured to store electronic instructions; a processor operable to execute the instructions; and a connectivity manager module coupled to the memory element and the processor, the endpoint is configured for establishing a wireless communication session with a fixed endpoint using a wireless communication protocol; generating a Phone Book Access Profile (PBAP) request to download a phone number associated with the fixed endpoint; receiving, via the wireless communication session, a PBAP response comprising a phone number identifying the fixed endpoint; and inputting the phone number identifying the fixed endpoint into a field used for initiating a call to the fixed endpoint. In another implementation of the endpoint, the phone number identifying the fixed endpoint is a temporary phone number that is assigned to the fixed endpoint based on a user logged into the online conference session. In yet another implementation of the endpoint, the fixed endpoint is a desktop voice over Internet protocol (VoIP) phone. In yet another implementation of the endpoint, the connectivity manager module is further configured for initiating, using a telephony protocol (e.g., VoIP), a call from the online conference session to the fixed endpoint using the phone number identifying the fixed endpoint. In some implementations of the endpoint, the PBAP request is generated when one or more of the following criteria is met: detecting the execution of a virtual meeting application, detecting the launching of a window in the virtual meeting application, detecting an input from a button, or any other criteria detectable by a virtual meeting application.

In another implementation of the endpoint, the PBAP response and the PBAP request are generated using an extended PBAP protocol, the extended PBAP protocol being extending to include data exchange over a plurality of wireless communication protocols. In this implementation of the endpoint, the plurality of wireless communication protocols can comprise near field communication (NFC) and Bluetooth.

In still other implementations of the endpoint, the connectivity manager module is further configured for prior to the establishing the wireless communication session with the fixed endpoint, identifying the fixed endpoint by: detecting a proximity of each of a plurality of endpoints using one or more wireless transmission protocols; generating a list of candidate communication endpoints, the list excluding any of the plurality of endpoints that is already included in the online conference; and receiving a selection of fixed endpoint from the list.

In yet another implementation of the endpoint, an audio data stream of at least one conference participant is provided to the fixed endpoint based on the initiated call.

In another implementation of the endpoint, the connectivity manager module is further configured for retrieving a phone number associated with a user; when it is determined that the phone number associated with the user does not match the phone number identifying the fixed endpoint, the phone number associated with the user is temporarily assigned to identify the fixed endpoint; when it is determined that the phone number associated with the user matches the phone number identifying the fixed endpoint, the phone number identifying the fixed endpoint remains unchanged; and inputting the phone number associated with the user into a field used for initiating a call to the fixed endpoint. In this implementation of the endpoint, the phone number associated with the user can be reassigned from a different fixed endpoint to the fixed endpoint. In some implementations of the endpoint, the connectivity manager module is further configured for initiating, using the telephony protocol, the call from the online conference session to the fixed endpoint using the phone number associated with the user.

In an implementation, a fixed endpoint, comprises a memory element configured to store electronic instructions;

a processor operable to execute the instructions; and a connectivity manager module coupled to the memory element and the processor, wherein the endpoint is configured for: generating a registration message for transmission to a call manager element; receiving, from the call manager element, a data object containing a phone number assigned to the fixed endpoint; establishing a wireless communication session with an endpoint using a wireless communication protocol; receiving, via the wireless communication session, a Phone Book Access Profile (PBAP) request to download a phone number associated with the fixed endpoint; and generating a PBAP response comprising the data object containing the phone number. In some implementations of the fixed endpoint, the endpoint is further configured for receiving a request to assign a different phone number to the fixed endpoint. In this implementation, the different phone number can be reassigned from a different fixed endpoint. In further implementations of the fixed endpoint, the endpoint is further configured for receiving a call, using a telephony protocol, from an online conference session using the phone number. In some implementations of the fixed endpoint, the PBAP request is received based on one or more of the following criteria being met: detecting the execution of a virtual meeting application, detecting the launching of a window in the virtual meeting application, detecting an input from a button, or any other criteria detectable by a virtual meeting application.

Example Embodiments

Manually entering a phone number into a virtual meeting client can lead to errors and can result in a user missing or being late for an important call. In other cases, a user may temporarily use a guest office, where the user does not know the phone number for a phone in the office. In this case, if the user attempts to join a virtual call they must first locate the phone number for the phone (e.g., a desktop phone located in the guest office). Locating the phone number may be challenging for the user due, at least, to the user not knowing the phone number to reach the desktop phone.

In some enterprise environments, a VoIP phone may have a different phone number assigned to the phone at various points during the day (or over the lifetime of the phone). In these cases, even a phone number printed on the face of the phone may be incorrect (i.e., calling the number will not connect to the phone). For example, a remote login system (e.g., hot-desking) allows multiple users to share a desk, where each user has the desk for a period of time. During each period of time, a phone number assigned to the VoIP phone corresponds to a user. For example, a first user may utilize the desk from 1 pm to 4:59 pm, during which time the phone number assigned to the phone is 555-555-0133. A second user may utilize the same desk (i.e., the same as the first user) from 5 pm-7 pm, during which time the phone number assigned to the phone is 555-555-0128. At all other times, the phone number may be 555-555-0109. A guest who attempts to use the shared desk may not be aware of the phone number assigned to the phone. In such a case, the user (i.e., the guest) may grow frustrated and attempt to manually retrieve the phone number (e.g., by using the desk phone to call a cell phone with a caller ID display to retrieve the number for the desk phone). Such tasks slow the process of connecting to a virtual meeting and may limit productivity. Simplified methods are needed for detecting an identifier for a nearby endpoint is needed (in this example, the VoIP phone on the shared desk).

The methods and system described herein simplify the detection of an identifier associated with an endpoint in an enterprise environment, e.g., by using a connectivity manager module that implements a protocol (e.g., an extended PBAP protocol) to (automatically) attain an identifier that may be dynamically associated with the endpoint. In some examples, a mobile endpoint (e.g., a mobile laptop computer, a mobile phone, etc.) may establish a Bluetooth connection with a fixed endpoint (e.g., a VoIP desktop phone, a desktop PC, etc.). The fixed endpoint transmits an identifier to the mobile endpoint using an extended Phone Book Access Profile (PBAP) protocol, as disclosed herein. Over the Bluetooth connection, the two devices can directly communicate with one another and need not use an intermediate device or network. A Bluetooth connection may function as a virtualized physical port on each device operably connected by a virtual cable and allowing transfer of data from one device directly to the other over the "cable". Other wireless protocols, such as Near Field Communication (NFC), offer similar direct connectivity between devices.

Phone Book Access Profile (PBAP) is a specification that defines protocols for exchanging phonebook information (e.g., phone number in a Phone Book Object) between devices. The PBAP standard was developed by the Bluetooth Special Interest Group and is built on the Bluetooth profile stack (i.e., the underlying (and integrated) wireless communication protocol is Bluetooth). According to the PBAP specification, PBAP is tailored for enabling hands-free use of a phone while in an automobile. In PBAP, a Phone Book Server Equipment (PSE) contains a phone book objects and a Phone Book Client Equipment (PCE) retrieves and/or access phone book objects from the PSE. An example use case is a user who wants to view caller id information in the car while driving. In this example, the phone is the PSE and the car is the PCE. The car queries the phone and retrieves a name for the number from which the call is received. The system and methods described herein extend the PBAP protocol for flexible use in an enterprise environment.

A fixed endpoint (or limited mobility endpoint), for example, is a device that is stationary at a location and/or is wired to a communications network. Several non-limiting examples of fixed endpoints include, e.g., a desktop phone that is wired to a PSTN network, or a VoIP phone wired to a VoIP network, e.g., by an Ethernet cable. A desktop VoIP phone is a non-limiting example of a fixed endpoint (which is distinguished from a mobile endpoint (e.g., mobile phone or laptop device), at least based on the fixed endpoint being wired to a communications network while the mobile endpoint may be wirelessly connected to the communications network and/or wired). While the desktop VoIP phone (i.e., the fixed endpoint) may be moved to a different location (e.g., a new office, wired to a difference port), doing so would require first disconnecting one or more cables from the device (e.g., wired AC power supply, USB, Ethernet cable), moving the device, and then re-connecting the cables in the new location. In this case, the VoIP Phone is primarily a stationary (fixed) device.

FIG. 1 is a simplified block diagram illustrating a communication system 100 for configuring multichannel video data in a meeting session environment. In specific implementations, communication system 100 can be provisioned for use in generating, managing, hosting, and/or otherwise providing virtual meetings. In certain scenarios (many of which are detailed below), communication system 100 may be configured for retrieving dynamically assigned numerical identifiers for an endpoint for use in a meeting session. The architecture of communication system 100 is applicable to any type of conferencing or meeting technology such as video conferencing architectures (e.g., Telepresence™), web cam configurations, smartphone deployments, personal computing applications (e.g., Skype™) multimedia meeting platforms (e.g., MeetingPlace™, WebEx™, other virtual meeting client, etc.), desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a connectivity manager module 150. As a general proposition, each MCS can be configured to coordinate video and voice traffic for a given online meeting. Additionally, each MCC can be configured to manage the MCS from data center meeting zone 140. Each of endpoints 112a-e can be provisioned with one or more virtual meeting applications. A virtual meeting application may comprise, e.g., a virtual meeting client, a connectivity manager module, or both (operably coupled to one another). A virtual meeting client is operable (e.g., by an endpoint) to establish a connection to a virtual meeting session. The connectivity manager module is operable to facilitate connections and data transfer with between endpoints.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

In the exemplary enterprise system of FIG. 1, the call manager element 116 may dynamically assign a phone number to one or more phones (e.g., VoIP phones). After a phone number is assigned to a phone, any call placed to the phone number will be effective to establish telephonic contact with the phone to which the number is assigned (at least until the number is unassigned from the phone). After a phone number is unassigned from a phone, any call placed to the phone number will not be effective to establish telephonic contact with the phone. In an example, a phone number may be assigned to more than one phone. In this case, calling (or initiating a call to) the phone number, results in initiating telephonic contact with each of the devices that have been assigned the number. The call manager element may change the number periodically based on a number of factors (e.g., change number based on time of day, based on a user detected nearby the device, etc.). If the phone number changes, the call manager may generate and transmit a message containing a new number to the VoIP phone.

Figure 2:
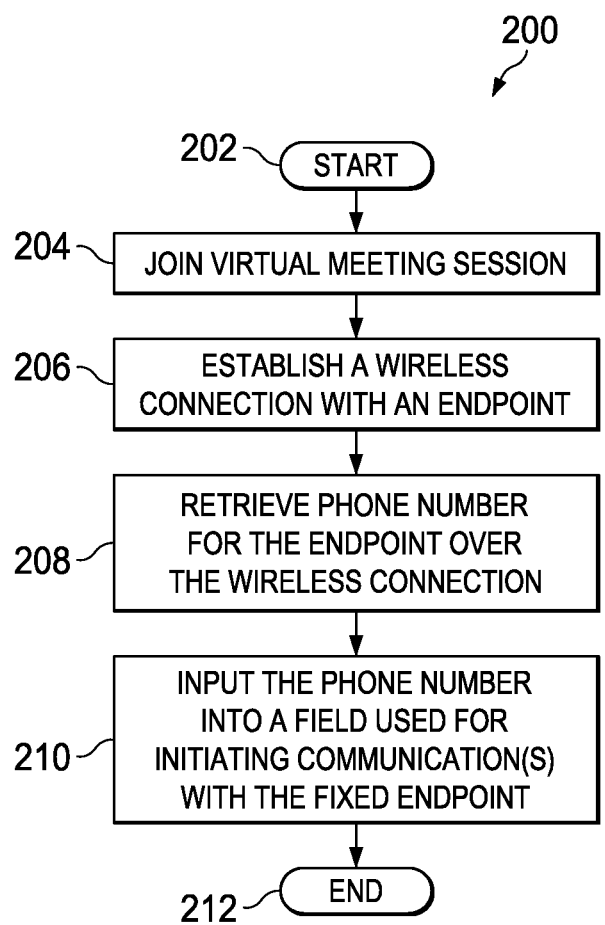
FIG. 2 is simplified diagram illustrating exemplary logic according to an embodiment of the present disclosure.

FIG. 2 is simplified diagram illustrating exemplary logic (logic 200) according to an embodiment of the present disclosure. This logic may be utilized to identify (e.g., retrieve) a numerical identifier associated with an endpoint. Logic 200 begins at 202 and advances to 204. At 204, a user, using an endpoint that implements a connectivity manager module (e.g., module 150) joins a virtual meeting session. In some embodiments, the endpoint may implement a client application for connecting to virtual meetings (i.e., a virtual meeting client); the virtual meeting client may include (or be coupled to), among other things, the connectivity manager module. Upon joining the virtual meeting session, the connectivity manager module (and/or the virtual meeting client) may receive a communications data stream in the meeting session. The communications data stream may include video data, audio data, chat data, and/or other communications data from other participants (via other endpoints) in the meeting session. At this point, the connectivity manager module (and/or the virtual meeting client) may be connected to a server (e.g., Media Conference Server 144), which connects the module to other endpoints that have joined the virtual meeting. A stream of communications data (i.e., a communications data stream) may be provided from the server to the endpoint (e.g., via the connectivity manager module).

At 206, a wireless connection is established (e.g., by connectivity manager module and/or processor) with an endpoint using a wireless protocol. For example, this can include establishing a wireless communication session with a fixed endpoint using a wireless communication protocol. The wireless communication protocol may be any wireless communication protocol (e.g., Bluetooth, NFC, Wi-Fi, Zigbee) that permits the communication of a fixed endpoint's numerical identifier to a mobile endpoint (e.g., computing device 414, laptop). Correspondingly, the wireless communication session may be a Bluetooth session, a NFC session, a Wi-Fi Session, a Zigbee session. After establishing the wireless connection to the endpoint, logic 200 advance to 208.

At 208, a phone number for the endpoint is retrieved over the wireless connection (e.g., by connectivity manager module and/or processor). The retrieval may include generating a request (e.g., Phone Book Access Profile (PBAP) request, or other protocol for generating requests for identifiers) to download an identifier (e.g., a phone number, vCard, and/or identifier) associated with the fixed endpoint. A device (e.g., implementing a connectivity manager module) may transmit the request message to the fixed endpoint. The fixed endpoint may generate and transmit, via the wireless communication session, a response message (e.g., a PBAP response) to the device.

After receiving the phone number for the endpoint (e.g., a phone number identifying the fixed endpoint), at 210 the phone number is input into a field used for initiating communication(s) to the endpoint. In one example, the phone number may be automatically populated (e.g., by connectivity manager module) into a function or field, e.g., for initiating the call within the virtual meeting. In one example, a device implementing a connectivity manager module, receives, via the wireless communication session, a PBAP response comprising a phone number identifying the fixed endpoint. After the phone number is input into the field, logic 200 ends at 212.

Logic 200 may be executed (or triggered) based on detecting that any criterion (or criteria) is met (or has not been met). For example, logic 200 may be executed when a virtual meeting application (e.g., a virtual meeting client) is launched on a device (e.g., when the virtual meeting application establishes a connection with the virtual meeting session). However, logic 200 is not limited to such an implementation. In further examples, subsequent to the user joining the virtual meeting session at 204, the systems and processes (e.g., methods and/or logic) for identifying the endpoint may be activated (or initiated) based on one or more criteria. In such an example, any one or more of procedures 206, 208, and 210 may be initiated based on one or more of the following exemplary (non-limiting) criteria: when a virtual meeting application is launched on a device; when a window (e.g., a call back window) launches in the virtual meeting application (e.g., the window may be launched either automatically or manually by a user); when a user presses a button (e.g., upon the user clicking a user-interface button or physical button for initiating detection of a nearby device); or any other criteria detectable by a virtual meeting application and/or connectivity manager module (e.g., any criterion and/or input that indicates that a user wishes to detect an identifier for a nearby endpoint, or any setting that specifies that detection of nearby devices should commence when the virtual meeting application and/or connectivity manager module is activated).

In some embodiments, upon the joining the virtual meeting or conference at 204, a connectivity manager module and/or processor may generate a prompt (e.g., graphical, aural, and/or tactile prompt) that provides options for the user to establish at least one additional connection (e.g., audio/video connection by phone or computer) to the virtual meeting (e.g., in addition to a communications data stream). These additional connection(s) can provide additional data streams of audio and/or video for the user to communicate with the other users that are participating in the virtual meeting or conference. For example, when the user initially joins the virtual meeting, they may only be provided with graphical data (and no audio data) in the communications data stream. In such an example, the prompt may be a prompt to establish an audio connection (i.e., the at least one additional connection) that corresponds to the graphical data in the communications data stream (e.g., audio of other participants in the virtual meeting). The prompt may include a field in which to input an identifier (e.g., URL, URI, a phone number, MAC address, or other text and/or numerical identifier, etc.) for establishing the additional connection. In one example, the prompt comprises a call back window, which is a window that allows a user to input a numerical identifier (e.g., phone number) at which they would like to be contacted. In some examples, procedures for detecting an identifier for an endpoint (e.g., procedures 208, 210, and 212, in order) may be activated when a window (e.g., a call back window) launches in a virtual meeting application. In other examples, the user may choose one of a plurality of options to generate the input of the numerical identifier. One option may be to manually enter the numerical identifier. Another option may be automatically detect a numerical identifier for any endpoints nearby that are capable of implementing a communication protocol (e.g., a telephony protocol and/or wireless communication protocol). If the user selects an option (e.g., a button) to automatically detect the numerical identifier, logic 200 may execute procedures for detecting an identifier for an endpoint (e.g., procedures 208, 210, and 212, in order), thereby activated the procedures based on detecting that a criterion is met (i.e., detecting that the user pressed a button).

In further embodiments, a call may be initiated based on the field used for initiating communication(s) to the endpoint. For example, subsequent to 210 (in logic 200), a call can be initiated, within the virtual meeting, using the phone number assigned to the endpoint (e.g., fixed telephonic endpoint, VoIP phone), which was input into the field. The call may be initiated using a call back function of a virtual meeting client (which may comprise a connectivity manager module). The call back function may allow a user to receive a call at a desired number (e.g., instead of asking the user to call a conference number for the virtual meeting). In an example, the call may be initiated, using a telephonic protocol, from the online conference session to the fixed endpoint using a phone number identifying the fixed endpoint. For example, a virtual meeting client may initiate a call, using VoIP protocol, to a desktop VoIP phone. In some examples, the user may be provided with an option to select one of a plurality of telephonic protocols to utilize when initiating the call. In other examples, the system may determine a measure of reliability for each of a plurality of telephonic protocols associated with a phone and may choose one protocol that has a highest reliability. After the call is initiated, the call may traverse a PSTN, a VoIP gateway, or any other series of action, which establish the call based on the call initiation generated by the connectivity manager module. Telephonic communication is established with the endpoint for provision in the virtual meeting. In some examples, the telephonic connection is between the connectivity manager module and the endpoint (e.g., fixed endpoint). In another embodiment, the telephonic connection is established between the virtual meeting server and the endpoint. Once the call is established, audio/video from the call is transmitted to the server and is provided in the virtual meeting session. Many users may join a virtual meeting session using logic 200. Logic 200 may be repeated for each device and/or a connectivity manager module that connects to a meeting (e.g., a virtual meeting session).

Figure 3:
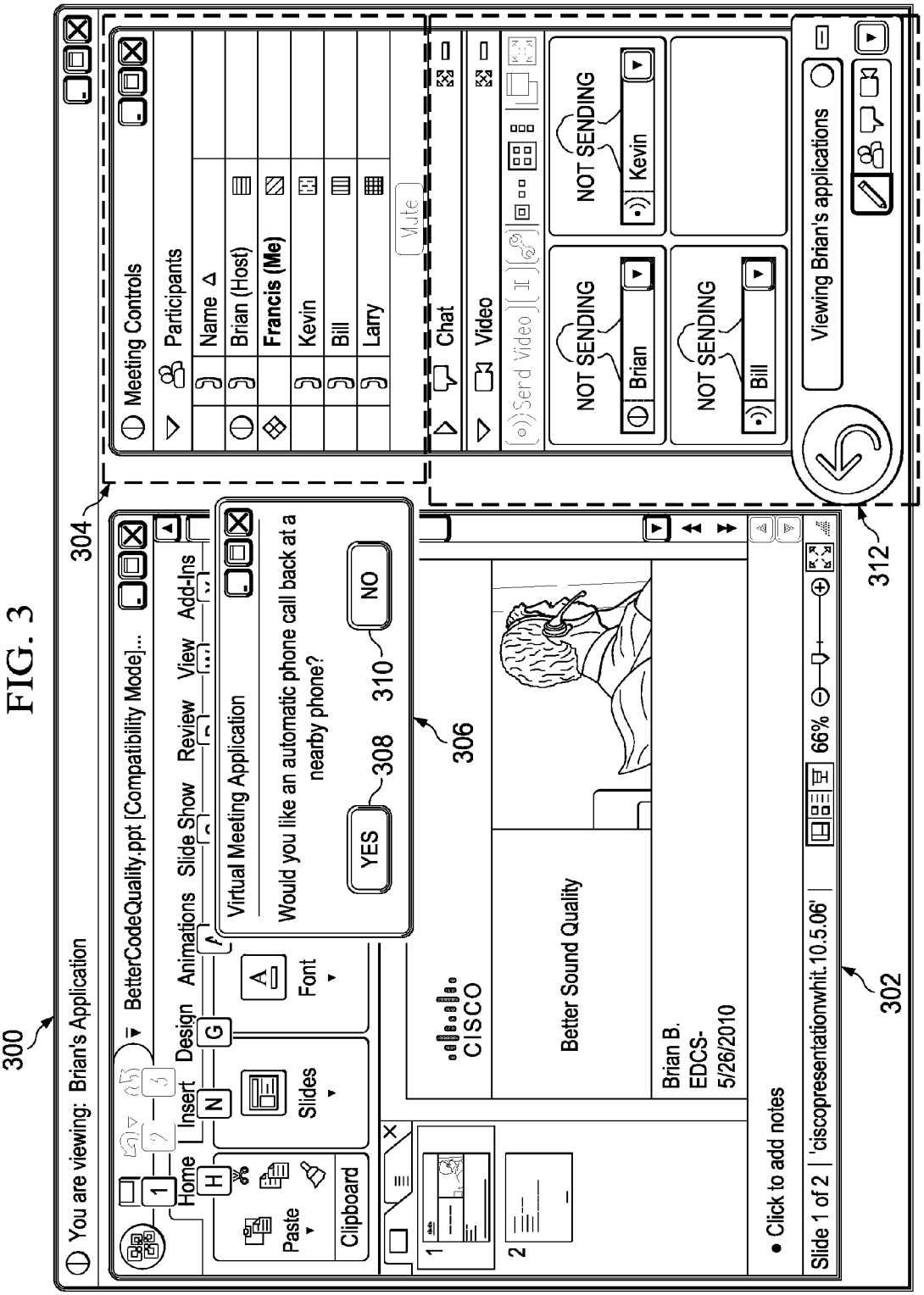
FIG. 3 is a simplified illustration of a user interface according to an embodiment of the present disclosure.

FIG. 3 is a simplified illustration of a user interface according to an embodiment of the present disclosure. In this example, a user, Francis, has just joined a meeting hosted by Brian. Virtual meeting window 300 is an exemplary interface that is generated for display on an endpoint for Francis. Virtual meeting window 300 includes graphical representation of a communications data stream. The communications data stream includes any visual and/or audio data transmitted to (and received by) devices that are logged into a virtual meeting session. In this example, the communications data stream comprises presentation data 302, component 304, component 312, and user option window 306. The presentation data 302 corresponds to content displayed by a designated presenter within the meeting. Component 304 includes a list of participants that are currently logged into the virtual meeting. Component 312 includes communications data (e.g., video chat data, text chat data, or any other communication data, or graphical representations thereof, between users participating in the virtual meeting). User option window 306 includes user interface (UI) buttons 308 and 310 for confirming or denying, respectably, an option for an automatic call back at a phone (e.g., a phone detected by the user's device).

A meeting may have one or more designated presenters who share content in the meeting. In this case, there is only one presenter, Brian, who is also the meeting host. However, in other cases, the presenter is not the host and, instead, is a different participant in the meeting. Brian is sharing a slide show application including a presentation titled "Better Sound Quality" with other participants in the virtual meeting (as illustrated in presentation data 302). In other examples, presentation data 302 may be other types of documents (e.g., word processor, images, etc.), a desktop, or any other presentation content that is shared by a meeting participant. In one example, the presentation data 302 may be content uploaded by a user that is not the presenter. Presentation data is streamed to the participants that are logged into the virtual meeting session.

The list of users actively logged into the meeting is illustrated in user interface (UI) component 304. In this example, the list of users in the meeting is Brian, Francis, Kevin, Bill, and Larry. UI component 312 includes audio data, video data, chat data, or any other communication data (or graphical representation thereof) between the users participating in the virtual meeting. The video chat corresponds to communications between the users in the list of participant. In this case, the user (Francis) has just joined the meeting and is viewing Brian's shared application via presentation data 302.

When Francis joins the meeting, his device only receives the graphical data shown in window 300. His device does not receive any audio data from the meeting (though audio data is being generated by other users in the meeting) due, in part, to not being connected to the audio portion of the meeting (e.g., he has not placed a phone call into a meeting phone number that corresponds to the meeting). All of the other users have joined the audio portion of the conference call, as indicated by a telephone icon adjacent to the name of each of the other users. Because Francis is not yet connected to the audio portion, no telephone icon is adjacent to his name.

The connectivity manager module generates an option 306, which provides an option for Francis (using his device) to join the audio portion of the meeting. Option 306 includes the message "Would you like an automatic call back at a nearby phone?" and provides input options of "YES" using UI button 308 and "NO" using UI bottom 310. If the user selects "NO" using UI bottom 310 (or by pressing the "X" in the upper-right corner of window 306), the system may prompt the user for manual input of a call-back number and/or may present a phone number associated with the virtual meeting for the user to call. If the user selects "YES" using UI button 308, at least a portion of logic 200 may be executed (e.g., by a connectivity manager module upon receiving the user selection of input button 308). Since the user has already joined the virtual meeting session (e.g., 202 in Logic 200), the execution of the logic may begin at 206 and execute through 212.

Figure 4:
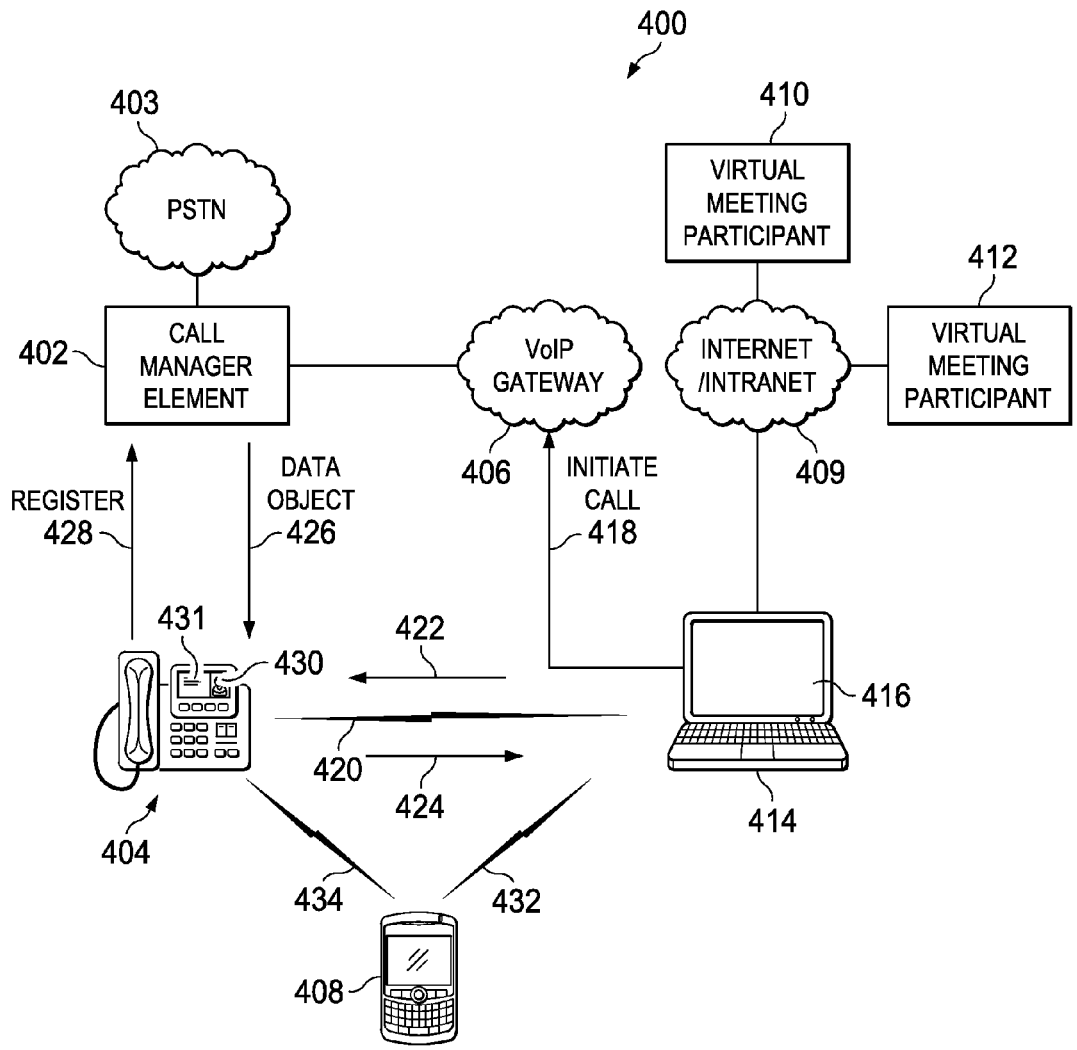
FIG. 4 is a simplified schematic diagram of an embodiment of the present disclosure.

FIG. 4 is a simplified schematic diagram of an embodiment of the present disclosure. System 400 includes voice over Internet protocol (VoIP) phone 404, computing device 414, mobile device 408, call manager 402, public switched telephone network (PSTN) 403, VoIP Gateway 406, Internet/Intranet 409, and virtual meeting participants 410 and 412. Each of VoIP phone 404, device 414, mobile device 408 implement one or more wireless communication protocols. VoIP phone 404 and device 414 can exchange data (e.g., 422 and 424) over wireless channel 420 using a wireless protocol. Mobile device 408 and device 414 can exchange data over wireless channel 432 using a wireless protocol. Mobile device 408 and phone 404 can exchange data over wireless channel 434 using a wireless protocol. The wireless protocols used for communication channels 420, 432, and 434 may be any wireless protocol (and/or wireless pairing technology) that permits the communication of a fixed endpoint's (e.g., phone 404) identifier to a mobile endpoint (e.g., computing device 414, laptop).

Device 414 is connected to internet/intranet 409, which connects the device to a virtual meeting and to other endpoints that are connected to the virtual meeting, e.g., participants 410 and 412. Both 414 and 412 may also connect to VoIP gateway 406 and/or PSTN 403. Communications data stream (or graphical representation thereof) 416 is generated for display on a display screen of device 414. The presentation data is streamed from the virtual meeting. In an implementation, the communications data stream 416 corresponds to at least a portion of the communications data stream included in window 300 (FIG. 3).

After connecting to the meeting session, a user may use device 414 to select "YES" using button 308 from window 306, (i.e., choose auto callback). The device 414 may establish a wireless communication session a nearby device based, in part, on the selection.

Establishing a wireless communication session may include detecting a proximity of each of a plurality of endpoints using one or more wireless transmission protocols. For example, device 414 may detect or identify nearby endpoints using a discovery protocol (e.g., Service discovery protocol (SDP) or Simple SDP), handshake, or message that is periodically broadcast. In FIG. 4, device 414 may use Bluetooth to discover a list of nearby endpoints including device 408 and device 404. At this point each of the devices has only been discovered but device 414 has not established a wireless connection session (for transferring an identifier, a numerical identifier, a phone number, etc.) with any of the endpoints.

After detecting the plurality of endpoints nearby device 414, a list of candidate endpoints for communication may be generated, e.g., by excluding any of the plurality of endpoints that is already included in the online conference. The Bluetooth discovery protocol provides an ID (not a phone number) for each device and may also include a descriptive name. The descriptive name or ID can be compared to the name or ID of any device already present in the virtual meeting. Any matches may be excluded from the list of candidates. Other criteria and or discovery protocols may be used may be used to filter the list of candidates including, e.g., excluding any device that does not implement a PBAP protocol. A descriptive name identified during discovery can be included in a user interface for allowing the user to select a device from the list of candidate endpoints.

Figure 5A:
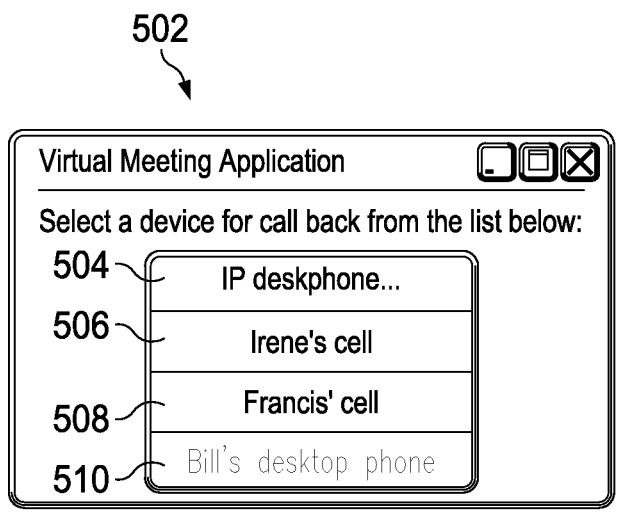
FIGS. 5A and 5B illustrate exemplary user interface components according to an embodiment of the present disclosure.

FIG. 5A illustrates an example graphical display of a list of candidate endpoints. Each endpoint was discovered using one or more protocols and each has a descriptive name. In FIG. 5A, virtual meeting window 502 including entries 504, 506, 508, and 510. Item 504 corresponds to VoIP phone 404. Item 506 corresponds to an endpoint that lies within a detection range of endpoint 414 but is not associated with the user or the virtual meeting. Item 508 corresponds to device 408 (which is Francis' mobile phone). Item 510 corresponds to a fixed telephonic endpoint in an adjacent office belonging to Bill, who is already in the virtual meeting. In this example, the device identified as "Bill's Desktop phone" is already on the call. Device 414 may determine (e.g., using a connectivity manager module) whether each device is already on the call, e.g., based on string matching a descriptive name or comparing an ID from a discovery phase (e.g., using a discovery protocol) to an descriptive name or ID available in the meeting system. In the example shown in FIG. 5A, it is determined (e.g., based on a matching name or ID) that Bill's phone is already on the call. The item that corresponds to Bill's phone (i.e., Item 510) is grayed out in the list to indicate at the device is already on the call (e.g., based on the determination). In some implementations, Item 510 (or any other phones already on the call) may be excluded from the list. In other implementations, if the user selects a phone that is already on, the other user to which the phone belongs (in this case Bill) is prompted for sharing his/her phone with the selecting user. A user may select any of the selectable candidate options, which includes items 504, 506, 508, and 510. In an example, a device implementing a connectivity manager module receives the user selection.

Upon selected item 504 from window 502 of FIG. 5A, the computing device 414 (of FIG. 4) may open a wireless communication session with the selected endpoint (in this case phone 404) using the wireless protocol, thereby establishing the wireless communication session over channel 420. In an example, a connectivity manager module on the device receives a user selection of fixed endpoint from the list. The device 414 then begins the process of retrieving a phone number associated with the device (e.g., using at least a portion of logic 200).

Device 404 and 408 may establish a wireless communication session over 432 in a manner similar to that described above for channel 420. Devices 408 and 414 may establish wireless communication sessions over channels 432 using any one or more of NFC, a PBAP protocol, or extended PBAPP protocol, as disclosed herein.

Turning back to FIG. 4, device 414 transmits messages to device 404 using the established wireless communication session on channel 420. Device 414 transmits request message 422 to phone 404 using the session. The request message may be a PBAP request message. In an embodiment, the message may be a PBAP or Extended PBAP request, generated by endpoint 414, to download a phone number associated with the fixed endpoint (e.g., device 404). Phone 404 receives message 422 via the session established over the wireless channel 420.

In response to receiving message 422, phone 404 may perform one or more verification steps before responding to the message. A verification step may include one or more of, for example:

determining whether the phone has been assigned a phone number; if not, the phone may request a phone number from a call manager (e.g., call manager element 403)

determining whether the phone number assigned to the phone matches an input phone number; if not, the phone may request that a call manager assignees the input phone number to the phone.

determining whether the contact data that is stored locally on the phone is up-to-date. If the data is not up-to-date, phone 404 may contact the call manager requesting an updated phone number.

Subsequent to any verification steps, phone 404 may generate a response message 424. The message may be a PBAP response comprising a data object containing the phone number assigned to the endpoint (e.g., a phone number identifying a fixed endpoint). The phone 404 transmits, over the wireless session on wireless channel 420, message 424 to device 414.

Device 414 receives, over the wireless session, message 424. The device then retrieves, from the message 424, the phone number assigned to phone 404. Device 414 inputs (e.g., using a connectivity manager module) the phone number assigned to phone 404 into a field used for initiating a call to the fixed endpoint. For example, the field may be an entry in a database of phone numbers, an input into a function used to initiate the call (e.g., an application programming interface for VoIP calls), and/or a field used for displaying the phone number (e.g., while the call is initiated). In some examples, device 414 initiates call 418 to phone 404 using the phone number. In an embodiment, the call is initiated, using a telephony protocol, from the virtual meeting session to a fixed endpoint (e.g., phone 404) using a phone number identifying the fixed endpoint. In the example of FIG. 4, such a call corresponds to initiating a VoIP call (e.g., via VoIP gateway 406) from Brian's virtual meeting (e.g., in FIG. 3) to phone 404. In other cases, where a fixed endpoint is not a VoIP phone, the call may be initiated using PSTN 403. In an embodiment, call 418 is initiated by sending packets of call data over intranet and/or internet 409 to VoIP gateway 406, where the packets are sent to phone 404. Telephonic communication, using the telephonic protocol, maybe established between the virtual meeting session and the fixed endpoint based on the call initiated by device 414. Once a call is received by device 404, the call maybe established. Some telephonic communication protocols allow transmission of not only audio but also video. For example, some VoIP implementations are capable of transmit both audio and video. After the call is connected to the phone, audio/video from the phone is transmitted to the virtual meeting (e.g., via MCSs/MCCs 144) and shared with other meeting participants. In some cases, the only content being transferred between VoIP phone 404 and the meeting is audio content. In other cases, the content includes both audio and video.

In some examples, after the phone establishes a telephonic connection with the virtual meeting, the communications data (e.g., chat/video data shown in UI component 312 in FIG. 3) may be transferred from the meeting interface 300 to the phone. For example, VoIP phone 404 includes a video display 430 and a text display 431. After connecting to the meeting, video display 430 may display video from at least one of the users in a virtual meeting. In addition, after connecting to the meeting, text display 431 may display chat data from at least one of the users in the virtual meeting. For example, the data generated for display in 430 and 431 may include data only from an active presenter in the virtual meeting. Alternatively, the data generated for display in 430 and 431 may include data only a selected one or more users in the meeting, regardless of the presenter. In effect, all of the data streamed to a participant in virtual conference may be subdivided into two mutually exclusive and collectively exhaustive subsets, where a subset of the data (e.g., communications data as in component 312 and/or participant information as in component 304) is sent only to phone 404 and the other subset of the data (e.g., presentation data 302) is sent only to device 414. Other participants may choose to divide their content differently or consolidate it all on a single device.

Other implementations may use an audio communication instead of a wireless communication protocol as described above. For example, a user may attempt to detect a phone that does not have an active wireless communication hardware (e.g., wireless communication hardware may not be present or may be present but non-functioning). In such a case, a connectivity manager module may provide an option for the user to use an audible communication option. For example, phone 404 may store a Pulse Code modulation (PCM) encoded file. The phone may play the PCM file using a speaker attached to (or included within) the phone to generate an aural output. The connectivity manager module may activate a microphone sensor for detecting the aural output by the phone generated based on the phone playing the PCM file on the speaker. Upon detecting the aural output, the connectivity manager module may decode the output to determine a phone number and may initiate a call to the phone based on the determined phone number.

Figure 5B:
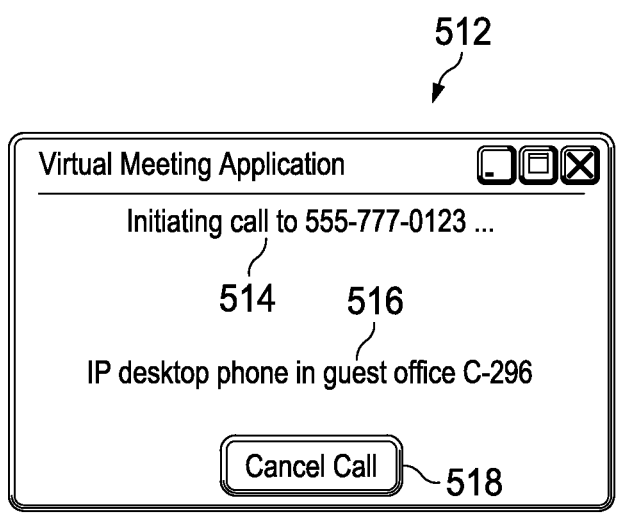

FIG. 5B illustrates exemplary user interface according to the present disclosure. In an embodiment, a time period—beginning at a point in time at which the user selects the phone 404 (e.g., from FIG. 5A) and ending at a subsequent point in time at which device 414 initiates call 418 (and/or establishes the call)—may be on the order of several seconds. During the period of time, window 512 (of FIG. 5B) may be generated for display (e.g., by device 414 implementing a connectivity manager module) to provide a visual indication of the call being initiated and/or established. Virtual meeting window 512 includes fields 514 and 516, and user interface (UI) button 518. Field 514 includes the text "Initiating call to 555-777-0123 . . . ". Field 516 includes the text "IP desktop phone in guest office C-296". In some examples, the phone number included in field 514 and the text included in field 516 is text that has been parsed (e.g., using a PBAP, and or Extended PBAP function) from a data object in message 424. In this example, the phone number identifying phone 404 (e.g., a fixed endpoint) has been input into field 514 for initiating a call to the phone 404. UI button 518 includes the text "Cancel Call.' If a user selects UI button 518 during the aforementioned period of time, the call is cancelled. When the call is connected, window 512 may be destroyed (and no longer displayed) without any further user input into to window 512.

Each wireless protocol may have a different detection range (e.g., a maximum distance from the device at which a signal source can be detected) relative to other wireless protocols. For example, Wi-Fi (IEEE 802.11) has a range that is on the order of tens to meters (e.g., 50 meters), Bluetooth may have a range that is on the order of a number of feet (e.g., 2 feet), and NFC may have a range that is on the order of inches (e.g., 1 inch). In some cases, a wireless protocol with a large detection range may capture many devices. In FIG. 5a, multiple devices are listed, but only one may be the device with which the user is interested in establishing a wireless connection (e.g., for detecting an identifier). In an implementation of the systems and methods disclosed herein, use a first wireless protocol (e.g., NFC) having a first detection range is used for a discovery phase and a second wireless protocol (e.g., Bluetooth) having a second detection range is used to transfer contact information (e.g., a phone number in a PBAP message(s)). In some examples, the first detection range is longer than the second detection range. Using the shorter-range protocol for discovery advantageously reduces the likelihood of detecting potentially unwanted devices (e.g., 506 in FIG. 5A) and may increase the likelihood of only detecting a desired device (e.g., 504 in FIG. 5A). Using a longer-range protocol for transmitting data (e.g., PBAP messages) allows the devices to move away from one another and maintain strong wireless connection (e.g., where wireless signal strength is sufficient for transferring a phone number between devices in less than one second). In one example, an endpoint 414 (e.g., a laptop) may be moved near (e.g., less than or equal to one inch apart) phone 404 for NFC discovery, after which the devices may be separated (e.g., separated by one or more feet). After discovery, the devices may switch from using NFC to using, for example, Bluetooth or Wi-Fi to transfer contact data (identifiers, phone numbers, etc.). In one implementation, this connection may be a direct connection between the devices that does not use any other devices and does not use an intermediate network between the devices.

In an implementation, VoIP phone 404 must be registered with a call manager element 402 before being deployed for use in the network shown in system 400. The call manager element 402 is a network manager for IP phones in the network. To begin registration, VoIP phone 404 generates a registration message 428 for transmission to the call manager element 402. Call manager 402 receives the message.

Upon receiving the registration message 428, the call manager element 402 may process the message to determine a phone number that should be assigned to VoIP phone 404. In some cases, call manager 402 may determine whether VoIP phone 404 is already assigned a phone number. If it is already assigned a number, it may generate a message including the assigned phone number. If it does not have a phone number, and may access a database and to retrieve an available phone number. After identifying a phone number corresponding to the phone, call manager stores the phone number in a memory with a association to the device e.g., using a manufacturers serial number of the phone for correspondence.

Call manager 402 generates a response message 426 containing a representation of the phone number and transmits the message 426 to the VoIP phone. VoIP phone 404 receives, from the call manager element, a data object (i.e., the representation) containing a phone number assigned to the fixed endpoint. Registration is completed once the device receives the response message.

After registration, the phone stores (in part or in whole) the data object and/or the phone number in a memory local to the VoIP phone. In an implementation, the phone number is stored as subscribe number (per the PBAP protocol) in a vCard file (e.g., vCard v2.1 or v3.0). The data object may also contain configuration data including, e.g., a PBAP role (client or server) assigned to the device, a wireless hardware settings (e.g., enable NFC, disable NFC, enable Bluetooth, disable Bluetooth, enable Bluetooth profile PBAP in PSE mode). In one example, the data object includes a vCard or a Pulse Code modulation (PCM) encoded file. A vCard is a standard format that includes predefined fields such as phone number, name address, birthdate, etc. The vCard may include a string or numerical encoding of the phone number. A PCM file is a digital audio file that when played causes a speaker to emit a series of audible pules. The PCM file in the data object may contain pulses that encode the phone number assigned to the phone according to the PCM file format. The PCM file may be stored on (and played by) the phone 404. In some implementations, the PCM file is stored in a block of memory typically used for ring tones for the phone.

The stored data object and/or phone number is be transmitted to a device (e.g., device 414) in response to a request (e.g., a PBAP request message) for the phone number identifying the phone.

In one example, device 414 may be a laptop that is carried, by a user, between different offices (e.g., different rooms in the same building and/or between different buildings). In one example, the user has a new guest office each day and each office having a corresponding desktop phone. While the laptop is mobile, the desktop phones are fixed within each of the offices. As the user moves (with the laptop) to between different offices, the laptop may utilize a connectivity manager module (according to the present disclosure) to automatically identify a phone number for a phone in each of the different offices.

In a further example, as the user moves from office to office, instead of identifying a phone number that is currently assigned to the phone, the user's laptop can implement a connectivity manager module and an extended PBAP protocol to request that the phone be (temporarily) assigned a number associated with the user (e.g., temporarily porting his normal desktop phone number or cell phone number to the local phone in the office). In one example, a user may tap the mobile device 408 to phone 404 to transfer the mobile device number to phone 404. Advantageously, the extended PBAP protocol presented herein includes an extended PBAP request message, which includes not only a request for a subscriber phone number but also explicitly includes a phone number for requesting assignment to the phone. The phone may then transmit the request for a new number assignment to a call manager element. Regardless of whether the assignment is successful, the phone will reply with a message containing a phone number assigned to the phone. Finally, the device can check whether the number reported by the phone matches the number in the message requesting assignment. If they match, then the assignment was successful. If they do not match, then the assignment was unsuccessful.

Figure 6:
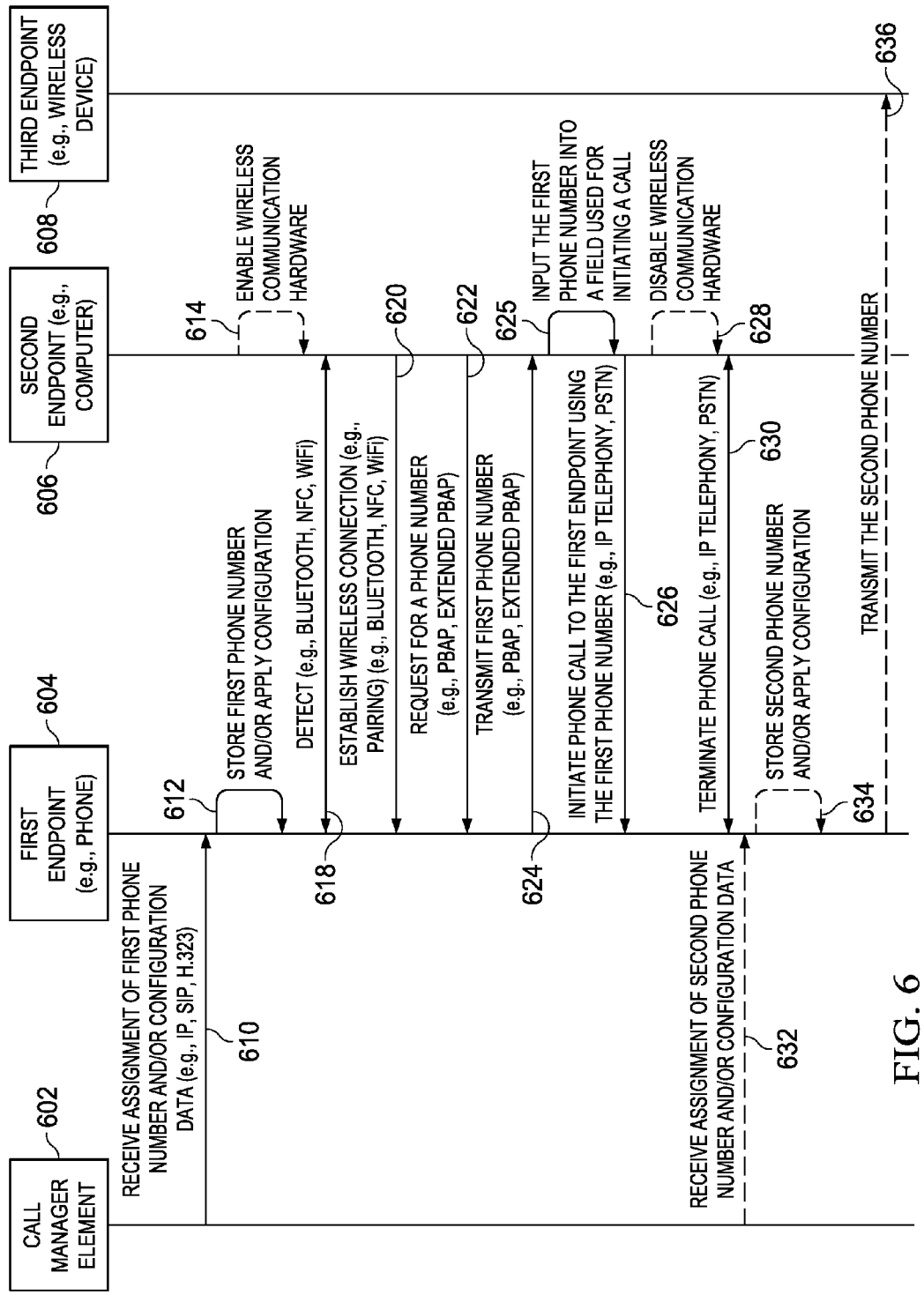
FIG. 6 illustrates a simplified messaging diagram for an embodiment of the present disclosure.

Turning now to FIG. 6, FIG. 6 illustrates a simplified messaging diagram for an embodiment of the present disclosure. System 600 includes call manager 602, first endpoint 604, second endpoint 606, and third endpoint 608. System 600 is illustrated within the context of having just joined a virtual meeting session and having request an automatic detection of an endpoint (e.g., a fixed telephonic endpoint). In one example, the actions/messages in FIG. 6 are executed in an order that follows from the top of FIG. 6 (e.g., beginning at 610) to the bottom of FIG. 6 (e.g., ending at 630 or optionally 636). At 610, endpoint 604 receives an assignment of a first phone number and/or configuration data. 610 is optional due, in part, to the fact endpoint 604 may not be a VoIP endpoint. In some implementations, 610 is only executed by VoIP endpoints (e.g., a VoIP phones). At 610, the assignment can be transmitted using, e.g., Internet protocol, SIP protocol, or H.323 protocol. At 612, endpoint 604 stores the first phone number and/or applies the configuration. In an embodiment, configuration may be data and/or instructions for the endpoint to configure itself to be in PBAP PSE server mode and/or enable a wireless hardware on endpoint 604 (e.g., Bluetooth transmitter/receiver hardware). At 614, endpoint 606 may enable wireless communication hardware, e.g., in response to a user selection of an option to auto-detect and may also activate itself up as a PBAP client. At 618, endpoints 604 and 606 detect one another. In some examples, either device can perform the detection. For example, endpoint 606 may detect, using a discovery protocol, endpoint 604. Alternatively, endpoint 604 may detect, using a discovery protocol, endpoint 606. The detection is executed using a wireless communication protocol (e.g., Bluetooth, NFC, Wi-Fi). At 620, endpoint 606 establishes a wireless connection (e.g., pairing) with device 604 using a wireless protocol (e.g., Bluetooth, NFC, Wi-Fi). In one example, the connection between endpoint 604 and endpoint 606 is direct (i.e., no intermediate devices and/or no intermediate network between the endpoints). Note that the detecting at 618 and establishing at 620 need not be implemented using the same wireless protocol. For example, the detection may be executing using Bluetooth protocol while a wireless connection (for requesting/transmitting a telephone number) may be established using Wi-Fi protocol. In another example, the detection may be executing using Near Field Communication protocol while a wireless connection (for requesting/transmitting a telephone number) may be established using Bluetooth protocol.

At 622, endpoint 606 requests for a phone number for endpoint 604. The request may be made using, e.g., PBAP or Extended PBAP, as disclosed herein. Request 622 may include a request for a subscriber number, which in PBAP protocol corresponds to the number assigned to the device. Request 622 may include a request for entries that are in the phonebook of the device, a subset of entries in the phone book, and/or a call history. Request 622 can also includes an attribute mask, which allows the requester to filter out unwanted fields in the receive data. At 624, endpoint 604 transmits the first phone number to endpoint 606 using e.g., PBAP, Extended PBAP. If endpoints 606 used the filter mask at 622, then the reply will only include the request fields as specified by the filter mask. At 625, endpoint 606 inputs the first phone number into a field used for initiating a call. In some examples, the phone number may be input into a field for transmitting the phone number to a third-party system for initiating a call to the phone, or input into a field used directly by endpoint 606 for initiating the call (e.g., in field 514 or field 516; FIG. 5B). At 626, endpoint 606 initiates (e.g., using IP telephony, PSTN, or a third-party system) a phone call to the first endpoint using the first phone number. Optionally, at 628, endpoint 606 may disable wireless communication hardware. Optional steps 614 and 628 may be related in that any connectivity manager module implemented on the device 606 may return the device to an original state corresponding to a state of the device before the module executed (i.e., may clean up after itself by returning device to its original state). At 630, either of the devices may terminate the phone call, e.g., IP telephony, PSTN, etc.

In a further example, at 632, endpoint 604 may receives an assignment of second phone number and/or configuration data. In one example, a user provides an input instructing that a number that is typically associated with the user's primary desktop phone be assigned to a desktop phone in a guest office, using the PBAP protocol as described herein. At 634, endpoint 604 stores the second phone number and/or applies the new configuration. The process for establishing a connection, transmitting requests, etc. between endpoint 608 and endpoint 604 may follow the processes as described for 618-622. At 636, the endpoint 604 transmits the second phone number to endpoint 608. Endpoint 608 may initiate a call as described with respect to 624.

Using the systems and methods disclosed herein a user can carry a mobile computing device from one office to another office and, once the user has arrived at a new office location, the user need not manually locate and input the phone number of the device for a virtual meeting. Instead, systems and methods disclosed herein enable automatically detecting a phone number for a nearby telephony device in the new office thereby simplifying the process of connecting the user (via the telephony device) to a virtual meeting.

Figure 7A:
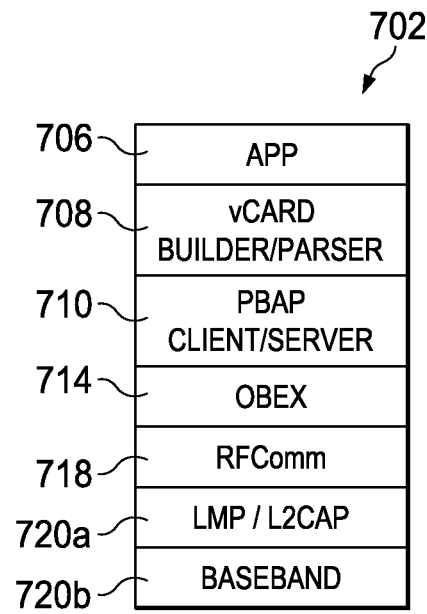
FIGS. 7A and 7B are simplified schematic diagrams of one or more embodiments of a PBAP Profile Stack according to the present disclosure.
Figure 7B:
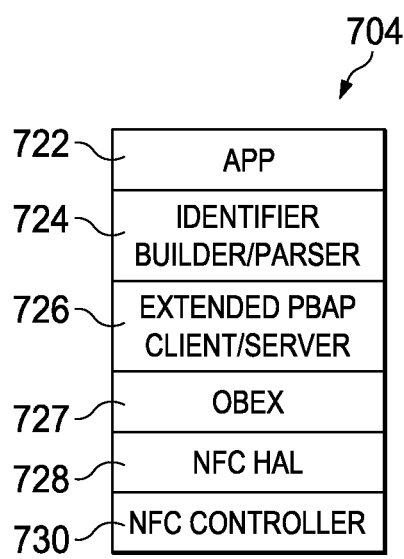

Turning now to FIGS. 7A and 7B, FIG. 7A illustrates a PBAP profile stack 702. The stack 702 includes application layer 706, vCard builder/parser 708, PBAP client/server 710, an object exchange layer 714, Radio frequency communication (RFComm) 718, and physical layers 720a and 720b. Physical layer 720a includes Link management protocol (LMP) and Logical link control and adaptation protocol (L2CAP). Physical layer 720b includes BASEBAND. FIG. 7B shows a profile for an extended PBAP profile stack 704, as disclosed herein. Profile stack 704 includes application layer 722, an identifier builder/parser 724, Extended PBAP client/server 726, an object exchange layer 727, NFC hardware abstraction layer (HAL) 728, and NFC controller (physical layer) 730. A key difference between PBAP profile stack 702 and extended PBAP profile stack 704 is that include that profile stack 704 replaces the Bluetooth wireless stack with an NFC wireless stack. For example, NFC HAL 728 and NFC controller 730 replace Bluetooth layers 718 and 720. In other implementation, an extended PBAP profile stack may replace the Bluetooth layers 718 and 720 with layers corresponding to a different wireless protocol (e.g., Wi-Fi). In operation, a PBAP response and/or a PBAP request are be generated using an extended PBAP protocol, which is extending to include data exchange over one or more wireless communication protocols (e.g., one or more of NFC, Wi-Fi, Zigbee). In contrast to other systems that utilize PBAP responses and/or requests, a system that utilizes an extended PBAP protocol (as disclosed herein) need not be implemented using Bluetooth and, instead, may be implemented in a plurality of wireless protocols. Advantageously, the system and methods described herein may utilize the extended PBAP protocol to, e.g., initiate a PBAP session in one protocol and subsequently switch to a different wireless protocol in which to pass PBAP requests (e.g., PBAP PullvCardEntry Function) and PBAP responses (e.g., Headers, Body/EndOfBody, vCard Object). Another key difference between stack 702 and stack 704 is that stack 704 includes a builder and parser for an identifier (e.g., any of a numeric identifier, a phone number, a PCM file, vCard, string, proprietary format) instead of only for a vCard. An identifier may be implemented in any data and/or object that allows passing data between devices. An extended PBAP protocol may require that two devices agree upon a type of identifier before transmitting/receiving the identifier.

Figure 8:
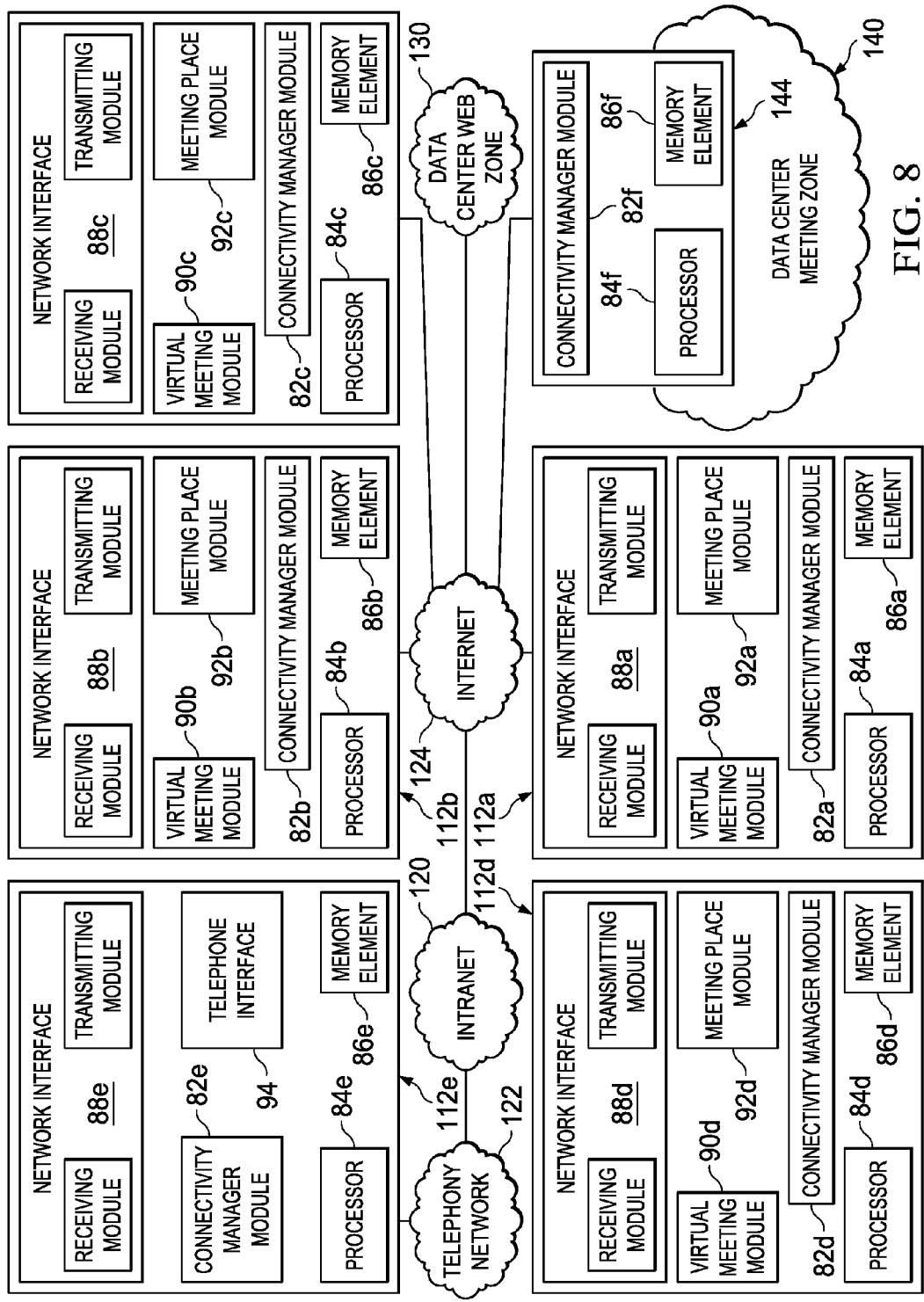
FIG. 8 is a simplified schematic diagram illustrating possible details related to an example infrastructure of the communication system in accordance with one embodiment.

FIG. 8 is a simplified block diagram illustrating one possible example of infrastructure associated with communication system 100. Each of endpoints 112a-e are provisioned with a respective connectivity management module 82a-e, a respective processor 84a-e, a respective memory element 86a-e, a respective virtual meeting module 90a-e (e.g., a virtual meeting application), a respective Meeting Place module 92a-e, and a respective network interface 88a-e, which includes a respective receiving module and a respective transmitting module for exchanging data (e.g., for exchanging packets in a network environment). Endpoint 112e also includes a telephony module for communicating with telephony network 122. Additionally, FIG. 8 illustrates an example implementation of MCSs/MCC 144 that is similarly provisioned with a connectivity management module 82f, a processor 84f, and a memory element 86f.

In one example implementation, each endpoint 112a-e and/or MCSs/MCC 144 includes software (e.g., as part of connectivity management modules 82a-f) to achieve or to support the endpoint identification functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these endpoint identification operations.

It is imperative to note that FIG. 8 is indicative of just one, of the multitude, of example implementations of communication system 100. Any of the modules or elements within endpoints 112a-e and/or MCSs/MCC 144 may readily be replaced, substituted, or eliminated based on particular needs. Furthermore, although described with reference to particular scenarios, where a given module (e.g., virtual meeting modules 90a-e, Meeting Place modules 92a-e, connectivity management modules 82a-f, etc.) is provided within endpoints 112a-e or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e are representative of any type of client or user wishing to participate in a meeting session in communication system 100 (e.g., or in any other online platform). Furthermore, endpoints 112a-e can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, and/or data exchanges within communication system 100. Endpoints 112a-e may also be inclusive of a suitable interface to the human user, such as a microphone, a display, or a keyboard or other terminal equipment. Endpoints 112a-e may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112a-e and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with talking stick operations. In a general sense, the arrangement depicted in FIG. 8 may be more logical in its representations, whereas a physical architecture may include various permutations/combinations/hybrids of these elements.

Note that in certain example implementations, the endpoint identification functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 8) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 8) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, connectivity management module 82a-f includes software in order to achieve the endpoint identification functions outlined herein. These activities can be facilitated by MCSs/MCC 144 and/or the various endpoints 112a-e. MCSs/MCC 144 and/or endpoints 112a-e can include memory elements for storing information to be used in achieving the intelligent endpoint identification functions, as outlined herein. Additionally, MCSs/MCC 144 and/or endpoints 112a-e may include a processor that can execute software or an algorithm to perform the endpoint identification controls, as discussed in this Specification.

These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

It is also important to note that the steps discussed with reference to FIGS. 1-8 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual meeting and Meeting Place conferencing environments or arrangements, the present disclosure may be used in any online environment that could benefit from such technology. For example, in certain instances, computers that are coupled to each other in some fashion can utilize the teachings of the present disclosure (e.g., even though participants would be in a face-to-face arrangement). The endpoint identification could still be respected by those meeting participants: even when they are physically co-located. Virtually any configuration that seeks to intelligently identify endpoint and connection users could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

What is claimed is:

1. A method comprising:
   establishing a wireless communication session with a fixed endpoint using a wireless communication protocol;
   generating a Phone Book Access Profile (PBAP) request to download a phone number associated with the fixed endpoint;
   receiving, via the wireless communication session, a PBAP response comprising a phone number identifying the fixed endpoint; and
   inputting, by an endpoint from the PBAP response, the phone number identifying the fixed endpoint into a field used for initiating a call to the fixed endpoint.

2. The method of claim 1, wherein the PBAP request is generated when one or more of the following criteria is met: detecting the execution of a virtual meeting application, detecting the launching of a window in the virtual meeting application, or detecting an input from a button.

3. The method of claim 1, wherein the phone number identifying the fixed endpoint is a temporary phone number that is assigned to the fixed endpoint based on a status of a user being logged into an online conference session.

4. The method of claim 1, wherein the fixed endpoint is a desktop voice over Internet protocol (VoIP) phone.

5. The method of claim 1, wherein the PBAP response and the PBAP request are generated using an extended PBAP protocol, the extended PBAP protocol being extending to include data exchange over a plurality of wireless communication protocols.

6. The method of claim 5, wherein the plurality of wireless communication protocols comprises near field communication (NFC) and Bluetooth.

7. The method of claim 1, further comprising:
   prior to the establishing the wireless communication session with the fixed endpoint, identifying the fixed endpoint by:
   detecting a proximity of each of a plurality of endpoints using one or more wireless transmission protocols;

generating a list of candidate communication endpoints, the list excluding any of the plurality of endpoints that is already included in an online conference; and receiving a selection of the fixed endpoint from the list.

8. The method of claim 1, further comprising:
retrieving a phone number associated with a user;
when it is determined that the phone number associated with the user does not match the phone number identifying the fixed endpoint, the phone number associated with the user is temporarily assigned to identify the fixed endpoint;
when it is determined that the phone number associated with the user matches the phone number identifying the fixed endpoint, the phone number identifying the fixed endpoint remains unchanged;
inputting the phone number associated with the user into a field used for initiating a call to the fixed endpoint.

9. The method of claim 8, wherein the phone number associated with the user is reassigned from a different fixed endpoint to the fixed endpoint.

10. A computer-readable non-transitory medium comprising one or more instructions that, when executed on a processor, configure the processor to perform one or more operations comprising:
establishing a wireless communication session with a fixed endpoint using a wireless communication protocol;
generating a Phone Book Access Profile (PBAP) request to download a phone number associated with the fixed endpoint;
receiving, via the wireless communication session, a PBAP response comprising a phone number identifying the fixed endpoint; and
inputting, by an endpoint from the PBAP response, the phone number identifying the fixed endpoint into a field used for initiating a call to the fixed endpoint.

11. The computer-readable non-transitory medium of claim 10, wherein the phone number identifying the fixed endpoint is a temporary phone number that is assigned to the fixed endpoint based on a status of a user being logged into an online conference.

12. The computer-readable non-transitory medium of claim 10, wherein the fixed endpoint is a desktop voice over Internet protocol (VoIP) phone.

13. The computer-readable non-transitory medium of claim 10, wherein the PBAP response and the PBAP request are generated using an extended PBAP protocol, the extended PBAP protocol being extending to include data exchange over a plurality of wireless communication protocols.

14. The computer-readable non-transitory medium of claim 13, wherein the plurality of wireless communication protocols comprises near field communication (NFC) and Bluetooth.

15. The computer-readable non-transitory medium of claim 10, further comprising:
prior to the establishing the wireless communication session with the fixed endpoint, identifying the fixed endpoint by:
detecting a proximity of each of a plurality of endpoints using one or more wireless transmission protocols;
generating a list of candidate communication endpoints, the list excluding any of the plurality of endpoints that is already included in an online conference; and
receiving a selection of fixed endpoint from the list.

16. An endpoint comprising:
a memory element configured to store electronic instructions;
a processor operable to execute the instructions; and
a connectivity manager module coupled to the memory element and the processor, wherein the endpoint is configured for:
establishing a wireless communication session with a fixed endpoint using a wireless communication protocol;
generating a Phone Book Access Profile (PBAP) request to download a phone number associated with the fixed endpoint;
receiving, via the wireless communication session, a PBAP response comprising a phone number identifying the fixed endpoint; and
inputting, by the endpoint from the PBAP response, the phone number identifying the fixed endpoint into a field used for initiating a call to the fixed endpoint.

17. The endpoint of claim 16, wherein the phone number identifying the fixed endpoint is a temporary phone number that is assigned to the fixed endpoint based on a status of a user being logged into an online conference.

18. The endpoint of claim 16, wherein the fixed endpoint is a desktop voice over Internet protocol (VoIP) phone.

19. The endpoint of claim 16, wherein the PBAP response and the PBAP request are generated using an extended PBAP protocol, the extended PBAP protocol being extending to include data exchange over a plurality of wireless communication protocols.

20. A fixed endpoint comprising:
a memory element configured to store electronic instructions;
a processor operable to execute the instructions; and
a connectivity manager module coupled to the memory element and the processor, wherein the endpoint is configured for:
generating a registration message for transmission to a call manager element;
receiving, from the call manager element, a data object containing a phone number assigned to the fixed endpoint by the call manager element;
establishing a wireless communication session with an endpoint using a wireless communication protocol;
receiving, via the wireless communication session, a Phone Book Access Profile (PBAP) request to download the phone number assigned to the fixed endpoint; and
generating a PBAP response comprising the data object containing the phone number.

* * * * *